United States Patent [19]

Kelterborn et al.

[11] Patent Number: 4,976,194
[45] Date of Patent: Dec. 11, 1990

[54] BREAD TOASTER

[75] Inventors: Heinz Kelterborn, Karben; Heinz Schiebelhuth, Frankfurt, both of Fed. Rep. of Germany

[73] Assignee: Braun Aktiengesellschaft, Kronberg, Fed. Rep. of Germany

[21] Appl. No.: 453,719

[22] Filed: Dec. 20, 1989

[30] Foreign Application Priority Data

Dec. 24, 1988 [DE] Fed. Rep. of Germany ....... 3843947

[51] Int. Cl.5 .................. A47J 37/08; H05B 1/02
[52] U.S. Cl. .................... 99/328; 99/329 R;
99/329 R T; 99/333; 99/385; 219/411;
219/413; 219/492
[58] Field of Search ............... 99/326, 327, 331, 332,
99/333, 334, 328, 329 R, 329 RT, 385, 389;
219/411, 413, 345, 482, 490, 492, 493, 501, 514,
518

[56] References Cited

U.S. PATENT DOCUMENTS

| | | | |
|---|---|---|---|
| 4,130,853 | 12/1978 | Baker | 219/501 |
| 4,238,995 | 12/1980 | Polster | 99/331 |
| 4,296,312 | 10/1981 | Salem | 99/329 R |
| 4,346,651 | 8/1982 | Schickedanz | 99/327 |
| 4,430,557 | 2/1984 | Eichelberger et al. | 219/411 |
| 4,510,376 | 4/1985 | Schneider | 99/327 |
| 4,645,909 | 2/1987 | Thoben et al. | 219/411 |
| 4,727,799 | 3/1988 | Ohshima et al. | 99/331 |
| 4,734,562 | 3/1988 | Amano et al. | 219/413 |

FOREIGN PATENT DOCUMENTS

| | | | |
|---|---|---|---|
| 6904032 | 8/1969 | Fed. Rep. of Germany. | |
| 1515042 | 12/1969 | Fed. Rep. of Germany. | |
| 1753119 | 1/1972 | Fed. Rep. of Germany. | |
| 2736596 | 2/1979 | Fed. Rep. of Germany | 99/327 |
| 2176306 | 12/1986 | United Kingdom | 99/327 |

OTHER PUBLICATIONS

Siemens AG, Bereich Bauelemente, "Programmierbarer Digitaler Langzeittimer SAB 0529", Siemens Components 22 (1984), pp. 18-21.

*Primary Examiner*—Timothy F. Simone
*Attorney, Agent, or Firm*—Fish & Richardson

[57] ABSTRACT

A bread toaster comprising a comparator circuit with a sensor responsive to infrared radiation to determine the toasting time of an object to be toasted is extended by a control circuit. The latter detects automatically, whether the bread toaster is used for toasting an object to be toasted that is introduced through a loading and unloading opening into its toasting chamber (toasting operation) or for warming up a respective item which is placed on top of the loading and unloading opening (warming-up operation). The control circuit controls during the toasting operation the operating time of the bread toaster in dependence upon the toasting degree adjusted by the user, while it puts the bread toaster into operation for a fixed period of time during the warming-up operation.

18 Claims, 3 Drawing Sheets

BREAD TOASTER

The present invention relates to a bread toaster.

BACKGROUND OF THE INVENTION

Bread toasters are known which—apart from the actual tasting process of a toasting item introduced through a loading and unloading opening into the toasting chamber of the bread toaster—likewise permit to warm up items outside of the toasting chamber. To this end, the item to be warmed up is placed on a retaining means which is mounted on the top of the bread toaster above the loading and unloading opening (see e.g. German utility model No. 69 04 032. When the object is being warmed up, no toasting item is in the toasting chamber, whereby the warm air emitting from the toasting chamber and the infrared radiation generated therein by a heating device may reach via the loading and unloading opening the object to be warmed up that lies on the retaining means.

The warming-up time for the respective item to be warmed up is adjusted in the known bread toaster by the same means as is the toasting time for a roll to be toasted. In the majority of the known bread toasters, the completion of the toasting process is performed by a mere time control and often by using bimetal elements (see e.g. DE-PS 178 53 119). The user of the toaster adjusts the time on the basis of pragmatical values acquired in practice.

Beside the use of bimetal elements, it is known already to perform the time control electronically in bread toasters according to the species. Thus, the magazine "Siemens-Components" 22 (1984) volume 1, pages 18 to 21 (see herein pictures 22 and 23 and the pertinent description) teaches already to use a programmable digital long-term timer (Siemens type model SAB 0529) which, by way of an integrated coded switch, permits to adjust toasting times ranging between thirty seconds and four minutes. The commencement of the toasting process is determined in that, after the manual start-up of the bread toaster, the long-term timer keeps two contacts closed by means of a magnet, the said contacts providing connection between the heating device and its voltage supply. Upon termination of the set toasting time, the magnet will be de-energized again by the long-term timer for concluding the toasting process, in consequence whereof the two contacts will re-open and the heating device will be separated again from its voltage supply.

Besides, a bread toaster is known (see DE-AS 15 15 042) permitting the user to directly set the desired toasting degree of the object being toasted instead of a toasting time found by experience. Upon attainment of this toasting degree, the toaster is set out of operation automatically irrespective of the toasting time. For controlling the toasting process, this known bread toaster comprises a sensor responsive to the infrared radiation which it is receiving as it emanates from the surface of the item being toasted, and which delivers a sensor signal derived therefrom to a comparator circuit, thereby disabling the bread toaster via a switch step when a predeterminable signal level is attained.

It is easily possible to improve upon this known comparator circuit to such extent that it allows to adjust various signal levels for the sensor signal that it allows to adjust various signal levels for the sensor signal and thus various toasting degrees, upon attainment of which the comparator circuit will issue a respective toasting-time control signal switching the bread toaster off.

When it is desired with a like sensor-equipped bread toaster to warm up an item placed outside of the toasting chamber on top of the loading and unloading opening of the bread toaster, there is the following difficulty:

Since the toasting chamber of the bread toaster does not contain an item to be toasted, the sensor receives an infrared radiation which meets it directly emitting from the heating device. Due to the fact that the temperature of the heating device, on start-up of the bread toaster after a short start-up time, ranges between 800 and 1000° C., while the toasting process of an item to be toasted will be interrupted already when the latter reaches a temperature of roughly 160° C.—even in the event of a maximum signal level being adjusted—, the sensor will issue after a short time already such a large sensor signal that the heating device of the bread toaster is set out of operation. However, the resulting relatively short operating time of the bread toaster is not sufficient to warm up an object placed on top of the loading and unloading opening of the bread toaster to the extent desired.

Therefore, it is an object of the present invention to devise a bread toaster in such a fashion that the operating time of the bread toaster, with the toasting chamber empty, is not controlled by the infrared radiation received by the sensor and hence is too short, but that the operating time of the bread toaster in this case is extended sufficiently long for the purpose of entirely warming up an item to be warmed up which is placed outside of the toasting chamber on top of the loading and unloading opening.

BACKGROUND OF THE INVENTION

According to this invention, the bread toaster comprises beside a comparator circuit for controlling the toasting degree of an item to be toasted also a control circuit which ensures that the user of the bread toaster does not have to take any additional measures when wishing to warm up a roll, for instance, on a retaining means fitted on top of the loading and unloading opening of the bread toaster, instead of the toasting process of an item to be toasted which is automatically controlled by the sensor. This is because the control circuit of the inventive bread toaster determines automatically whether the operating time of the bread toaster is controlled by the infrared radiation received by the sensor, or whether the bread toaster must stay sufficiently long in operation for warming up the respective object.

The inventive bread toaster inheres the advantage that it can be used without restriction for warming up an item that is placed outside of the toasting chamber apart from permitting a toasting process of a toasting object disposed inside of the toasting chamber which is controlled by a sensor. When comparing the reference signal with the sensor signal at a first definable point of time, the fact is made use of that the signal levels of any desired sensor signals which are practically possible during toasting processes and the sensor signal issued when the toasting chamber is empty have differing orders of magnitude. Hence follows, this comparison results in all practically conceivable cases in the selection of the proper type of operation, i.e. toasting or warming-up operation. In addition thereto, the inventive bread toaster is always set into operation for the same period of time, provided that the type of operation it is in is the warming-up operation, whilst the warming-up process in bread toasters known from the state of the art after repeated operation is constantly shortened due to the bimetal elements used heating up.

A particularly favourable embodiment of the inventive bread toaster is attained by the use of a timer which issues a first timer signal at the first definable point of time and furtheron issued a second timer signal which determines the time interval during which the brad toaster is in the warming-up operation. In this embodiment of the inventive bread toaster, the sensor signal together with the reference signal is supplied to a second comparator whose output signal, in turn, is delivered to a second coupling stage to which, simultaneously, also the first timer signal is applied. WHen a memory flip-flop is still connected downstream of the first coupling stage, it is rendered possible in a simple and inexpensive manner to memorize the result of the comparison between sensor signal and reference signal which is obtained at the first definable point of time, and hence to memorize the type of operation, i.e. warming-up or toasting operation.

Another advantageous embodiment of the inventive bread toaster can be seen in controlling also the reference signal by a third timer signal issued by the timer, the latter signal being produced in an assembly unit during a specific time interval after putting the bread toaster into operation, on the one hand, and being compared with the sensor signal after termination of the time interval, on the other hand. It is thereby possible to perform the comparison between sensor signal and reference signal at a point of time at which the sensor signals related to the warming-up and/or toasting operation inhere particularly characteristic differences.

When the assembly unit is formed of an RC-element, on the one hand, and a comparator, on the other hand, which latter operates as an amplifier having the amplification factor $V=1$ during the time interval, it is accomplished by most simple and low-cost means that, immediately upon termination of the time interval, the instantaneous level of the sensor signal is applied to both inputs of the second comparator and, in the further course of time, a well reproducible reference signal is generated which is applied to the positive input of the second comaprator.

In order to still further improve the reproducibility of the time variation of the reference signal, it is expedient to choose as a capacitor an electrolytic capacitor with little residual current. It is thereby safeguarded that there may occur a merely negligible adulteration of the reference signal caused by a fraction of residual current flowing in the capacitor itself, in the event that the capacitor discharges through a discharge resistor having a relatively great resistance value.

An expedient improvement upon this invention resides in stabilizing the voltage applied to the positive connection of the capacitor by virtue of a Zener diode. It is this way possible in a straightforward and inexpensive manner to produce stable reference signals even when the supply voltage of the bread toaster fluctuates within wide limits, and to ensure thereby that the respectively existing type of operation (toasting or warming-up operation) of the bread toaster is correctly detected by the toaster's control circuit.

To safeguard that the control circuit stays operable even in the event of an extremely large sensor signal level which is scarcely conceivable in practical use, a favourable embodiment of this invention resides in extending the control circuit by a clamping circuit which prevents that the voltage value at the negative connection of the electrolytic capacitor will rise in excess of the voltage value at said's positive connection.

Simply and inexpensive, the clamping circuit can be realised in that a diode is connected with its cathode to a voltage divider and with its anode to the output of the comparator comprised in the assembly unit.

In order to practically completely charge the capacitor pertaining to the assembly unit during the time interval, on the one hand, and in order to obtain after termination of this time interval a reference signal rising largely linearly with time, on the other hand, the capacitor is charged during the time interval via a first resistor having a relatively small resistance value, whilst subsequently it can discharge but little starting from the first predeterminable point of time via a comparatively large resistor.

It has proven that when choosing the time interval to be roughly 4 seconds and the first definable point of time to be 8 seconds and, further, the time constant of the RC-element composed of the first resistor and the capacitor to have the magnitude of $10^{-1}$ seconds and the time constant of the RC-element composed of the capacitor and the discharge resistor to have the magnitude of 100 seconds, the comparison between the reference signal and the sensor signal will cause the bread toaster to select the proper type of operation in all practically possible cases.

When the inventive bread toaster is improved such that the timer additionally issues a fourth timer signal which, in conjunction with the second timer signal, is supplied to each one input of a third coupling stage and to any one of the two inputs of a fourth coupling stage, the advantage is achieved in the toasting operation that the bread toaster is automatically set out of function at the point of time the second change of the level of the second timer signal from LOW to HIGH takes place. It will be prevented this way upon failure of the sensor or in the event of the other causes which result in a signal level of the sensor signal not sufficient to disable the toaster that the bread toaster remains in operation inspecifically long, what avoids all related shortcomings such as charring of the object to be toasted as well as the resulting offensive smell and overheating of the bread toaster.

A bread toaster with a time function element that includes a capacitor and a resistor connected between the fourth coupling stage and the memory flip-flop represents a straightforward and cost-efficient improvement which causes the memory flip-flip to assume its storing condition, from which it can be transformed into its inverted condition by a change of the signal level at only one of its two inputs.

All coupling stages can be designed as NAND-gates. Hence follows that most simple, customary switch elements will do as coupling stages, what has favourable effects on the price for manufacture of the control circuit.

It has shown in practical tests that in the majority of cases the item being warmed up is warmed up sufficiently already after an operating time of roughly one minute. Practical tests have proven furthermore that the subdivision of the warming-up operation into one-minute intervals brings about an item which, admittedly, after another warming-up process, differs sufficiently from the preceding warming-up process. On the other hand, there is no danger that the item being warmed up will be burnt or even charred by only one more warming-up cycle.

BRIEF DESCRIPTION OF THE DRAWING

One embodiment of this invention will be described in more detail hereinbelow with reference to the accompanying drawings. In the drawings.

DESCRIPTION OF PARTICULAR EMBODIMENT

For more distinctly distinguishing between individual switch conditions of the comparator circuit and the control circuit, on the one hand, a toasting operation is referred to hereinbelow when a toasting object, e.g. a slice of bread, has been introduced into the toasting chamber of the bread toaster. On the other hand, a warming-up operation is referred to whenever an item is placed on a retaining means arranged on top of the loading and unloading opening of the bread toaster.

During the toasting operation, a sensor 1 (see FIG. 1) senses the infrared radiation reflected from the surface of a non-illustrated slice of bread, the said slice of bread being exposed to and thereby toasted by the infrared radiation of a heating device which is arranged in the toasting chamber and is not displayed either. During the roll warmingup operation, that means in the absence of a slice of bread in the toasting chamber, infrared radiation from the heating device directly meets the sensor 1, for what reason the intensity received by the sensor 1 will rise considerably faster and reach a considerably higher end value than will be the case when a slice of bread is fed into the toasting chamber. The signal issued by the sensor 1 to an amplifier 2 connected thereafter is applied via a potentiometer 3 to the positive input of a first comparator 4. A reference voltage is applied to the negative input of the first comparator 4.

Figure 2:
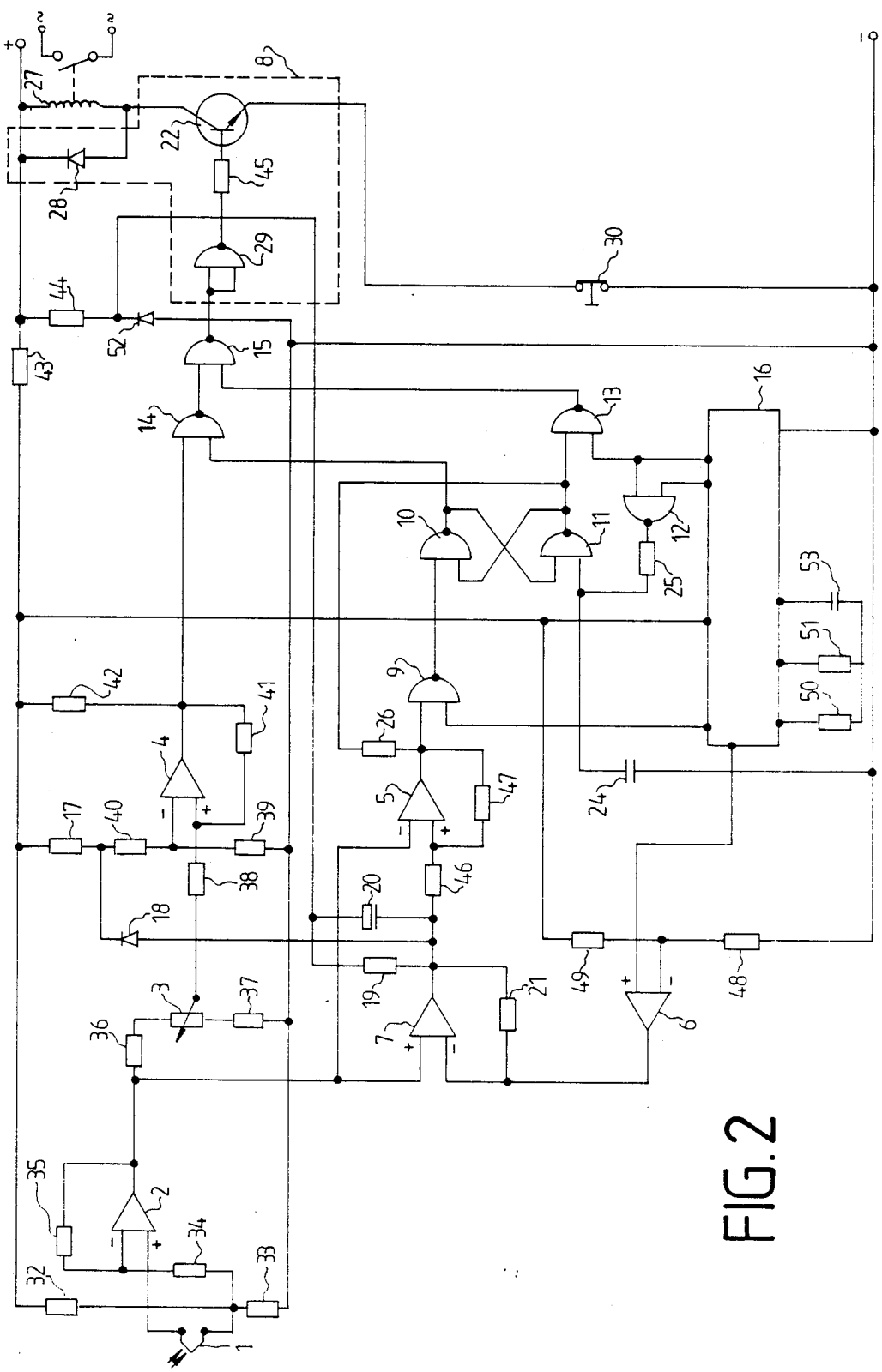
FIG. 2 is a detail diagram in respect of the block diagram as shown in FIG. 1.

FIG. 2 shows in detail the wiring of the amplifier 2 and the first comparator 4. Resistors 34 and 35 serve to determine the amplification factor of the amplifier 2, while a voltage divider used for operating the sensor is formed by two resistors 32 and 33. A resistor 36 is connected upstream and a resistor 37 is connected downstream of the potentiometer 3. The resistor 36 forms a barrier resistance, whereas the resistor 37 effects that no voltage of zero volt is adjustable for the first comparator 4.

The first comparator 4 is wired up with resistors 17, 38, 39, 40, 41 and 42 which, on the one hand, serve for its negative feedback and, on the other hand, for a voltage divider for the reference voltage applied to its negative input. The reference voltage applied to the negative input of the first comparator 4 is for instance roughly plus 2.6 volt.

When the sensor signal $U_s$ issue at the output of the amplifier 2 exceeds the reference voltage, the first comparator 4 will switch from LOW to HIGH at its output side. The toastingtime control signal R obtained this way is supplied to an input 14a of a first coupling stage 14, the output 14c whereof connects to an input 15a of a NAND-gate 15, whose latter output 15c, in turn, connects to the input of a switch step 8.

As is discernible from FIG. 2, the switch step 8 substantially comprises a npn-transistor 22 which, on its base side, connects via a resistor 45 with a NAND-gate 29 wired up as an inverter. In the emitter section of the transistor 22, a switch 30 is arranged which serves as an emergency switch-off of the bread toaster which the user must be allowed to make at any time. Further, the switch step 8 comprises a holding magnet 27 which, during the operating time of the bread toaster, locks a non-illustrated slide rack in a known fashion inside the toasting chamber of the bread toaster, the said slide rack serving as a support for the item being toasted. Connected in parallel to the coil of the holding magnet 27 is a freewheel diode 28 for protecting the transistor 22 against the voltage peaks related to the opening of the holding magnet 27. When releasing the holding magnet 27, the slide rack and possibly a slice of bread held by its is moved out of the toasting chamber, and the heating device is separated from its voltage supply, in consequence whereof the toasting action is terminated.

By virtue of the potentiometer 3, the amount of the sensor signal $U_s$ and hence the toasting degree of an item to be toasted in the toasting chamber is defined. The duration of toasting results from the time interval passing until the growing sensor signal $U_s$ exceeds the reference voltage at the negative input of the first comparator 4.

Since the first coupling stage 14 is a NAND-gate, the output 14c of this NAND-gate 14 will remain at least for so long on HIGH-13 irrespective of the signal level applied to its second input 14b—as a LOW-signal is applied to its first input 14a. Hereinbelow, as shall still be substantiated in the following, it is assumed that a HIGHsignal level is applied to both the second input 14b of the NAND-gate 14 and to the second input 15b of the NAND-gate 15. When the output signal of the first comparator 4 alternates from LOW to HIGH under this precondition due to the fact that the sensor signal $U_s$ exceeds the reference voltage applied to its negative input, then the signal at the output 14c of the first coupling stage 14 alternates from HIGH to LOW, on the one hand, and the signal at the output 15c of the NAND-gate 15 alternates from LOW to HIGH, on the other hand. This signal change at the input of switch step 8 has as a result that the holding magnet 27 is separated from its voltage supply and releases the slide rack. The bread toaster is put out of operation thereby.

Figure 1:
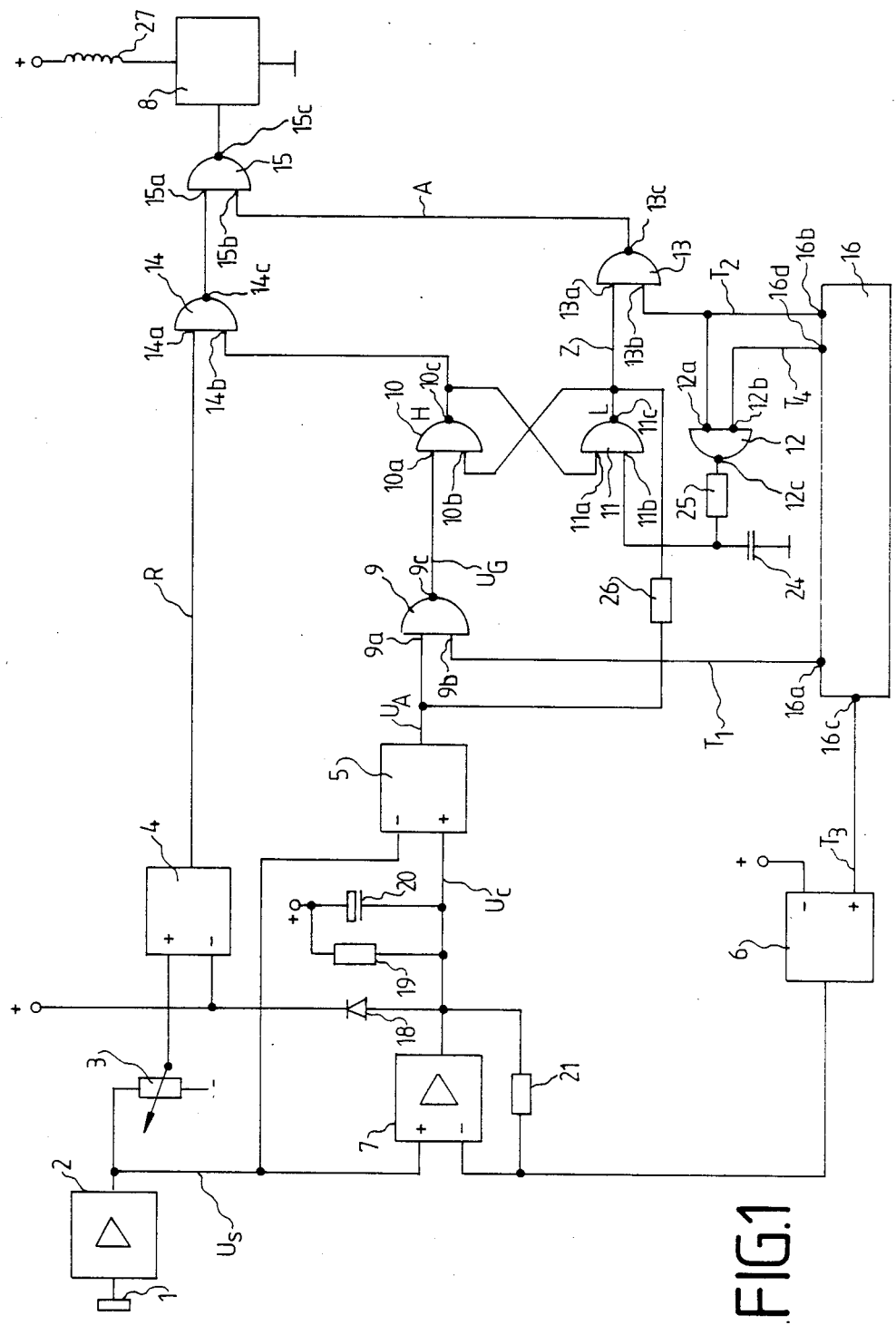
FIG. 1 is a block diagram of the circuitry comprising the comparator circuit and the control circuit.

After the principal mode of function of the comparator circuit has been described so far, the principal mode of function of the control circuit will be described hereinbelow by way of FIG. 1. A basic component of the control circuit is a memory flip-flop composed of two NAND-gates 10 and 11. Directly upon the start-up of the bread toaster, the memory flip-flop 10, 11 is in its basic condition in which its input 10a and its output 11c have a HIGH-level, while its input 11b and its output 10c are on the LOW-level. The output 10c of the memory flip-flop 10, 11 is connected with the second input 14b of the first coupling stage 14, whereas its output 11c connects to the first input 13a of a third coupling stage comprising a NAND-gate 13.

The condition of the memory flip-flop 10, 11 is essentially determined by the periodical signals issued by a timer 16 at its outputs 16a, 16b, 16c, all signals starting at the LOW-level with the start-up of the bread toaster and alternating to the HIGH-level for the first time after half the cycle. At its output 16a, The timer 16 issues a first timer signal $T_1$, whose level alternates from LOW to HIGH eight seconds after the bread toaster's start-up (hence the cycle is 16 seconds long), whilst it issues at its second output 16b a second timer signal $T_2$ whose level changes to HIGH after one minute. Furthermore, the timer issues a third timer signal $T_3$ at its third output 16c which alternates from LOW to HIGH-level after 4 seconds, while it finally issues at its fourth output 16d a fourth timer signal $T_4$ whose level changes from LOW to HIGH after two minutes.

Figure 3:
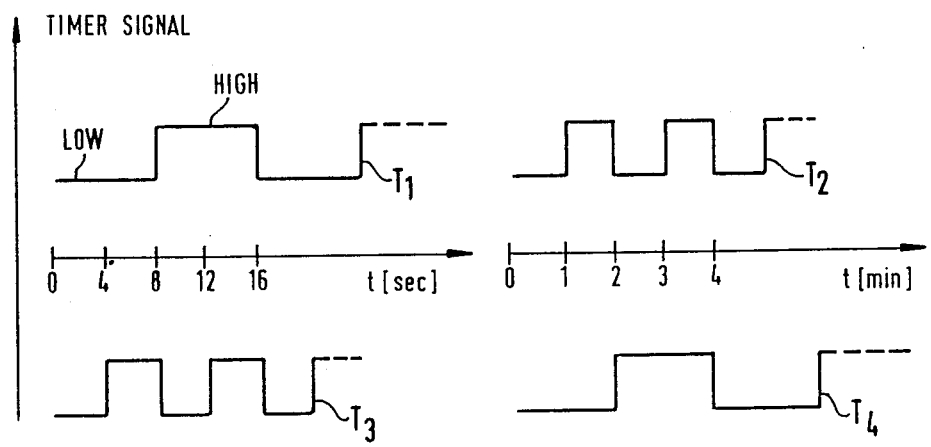
FIG. 3 is a pulse diagram of the four timer signals issued by a timer comprised in the control circuit according to FIGS. 1 and 2.

All timer signals $T_1$ to $T_4$ have been illustrated graphically once more in FIG. 3 for the sake of clarity.

Owing to the wiring up of the timer 16 with corresponding structural elements, e.g. with two resistors 50 and 51 and one capacitor 53, which are connected to three of its other outputs, the various timer signals can be varied in respect of their time sequence. Both the second timer signal $T_2$ and the fourth timer signal $T_4$ are supplied to the two inputs 12a and, respectively, 12b of a fourth coupling stage 12 which is composed of a NAND-gate and the output 12c of which connects to the input 11b of the memory flip-flop via a time function element composed of a resistor 25 and a capacitor 24. Since both inputs of the NAND-gate 12 are at LOW immediately upon start-up of the bread toaster, its output 12c has a HIGH level. As furthermore the entire voltage at the output 12c of the NAND-gate will decline on the resistor 25 directly upon start-up of the bread toaster, the input 11b of the memory flip-flop has a LOW level at this moment.

The third timer signal $T_3$ at the output 16c of the timer 16 is applied to the positive input of a third comparator 6 whose negative input is supplied with a reference voltage via a voltage divider composed of resistors 49 and 48 (see FIG. 2). When the resistors 48 and 49 are appropriately dimensioned, the output of the third comparator 6 which is connected to the negative input of a comparator 7, at the positive input of which, in turn, the amplified sensor signal $U_s$ is applied, is closed during a time interval $\Delta t = 4$ seconds, during which the third timer signal $T_3$ is on the HIGH level (see FIG. 3). The comparator 7 whose output is connected with the positive input of the second comparator 5 performs as an amplifier with the amplification factor $V=1$. The amplified sensor signal $U_s$ applied at its positive input, therefore, is taken at its output during this time interval. If, however, the third timer signal $T_3$ is on LOW beyond the time interval $\Delta t$, The output of the third comparator 6 is in its conductive condition again.

Connected in parallel to the connecting line between comparator 7 and the positive input of the second comparator 5 are a resistor 19 and an electrolytic capacitor 20 of little residual current, while in turn the amplified sensor signal $U_s$ is applied to the negative input of the second comparator 5.

By suitably dimensioning the resistors 44, 21 and 48 shown in FIG. 2, both the negative and the positive connection of the electrolytic capacitor 20 are on the level of the supply voltage stabilized over a Zener diode 52 immediately upon start-up of the bread toaster at the time $t=0$. During the time interval $\Delta t = 4$ seconds, the electrolytic capacitor 20 is charged over a resistor 44, since then the instantaneous signal level of the amplified sensor voltage $U_s$ is applied to its negative connection.

The consequence thereof is that immediately upon termination of the time interval $\Delta t$ at the moment $t_1$ (see FIG. 3), at which the third timer signal $T_3$ will alternate from HIGH to LOW again, the instantaneous level of the amplified sensor signal $U_s$ is applied to both inputs of the second comparator 5.

The time constant decisive for the charging process of the electrolytic capacitor 20 is dictated by its capacity and by the resistance value of the resistor 44 and amounts to $10^{-1}$ seconds, for instance, when the capacity of the electrolytic capacitor 20 is 100 $\mu F$ and at a resistance value of the resistor 44 of 1K$\Omega$.

Due to the change of the third timer signal $T_3$ from HIGH to LOW occurring at the moment $t_1$ and the related change of the output of the third comparator 6 from the closed into the conductive condition, the comparator 7 will not act as an amplifier any more, from what ensues that the electrolytic capacitor 20 discharges again over the resistor 19.

Therefore, according to FIG. 3, the level of the output signal $U_A$ of the second comparator 5 upon termination of the time $t = t_1 = 8$ seconds until the moment $t = 12$ seconds (hence the defined period of time $t_x = 4$ seconds) depends upon whether the sensor signal $U_s$ or a reference signals $U_c$ formed by the discharge of the electrolytic capacitor 20 is greater at the positive input of the second comparator 5.

The time variation of the reference signal $U_c$ is dictated by the time constant for the discharging action which is defined by the resistor 19 and by the electrolytic capacitor 20, whilst the magnitude of the sensor signal $U_s$ is decisively depending upon whether or not an object to be toasted is in the toasting chamber. By suitably choosing the time constants, e.g. with the given capacity of the electrolytic capacitor 20 being 100 $\mu F$ and by choosing a resistance value of 1.2 M $\omega$ for the resistor 19, on the one hand, and by the wiring up of amplifier 2, on the other hand, it is possible to attain the variation of reference signal $U_c$ and sensor signal $U_s$ which is principally illustrated in FIG. 4.

Figure 4:
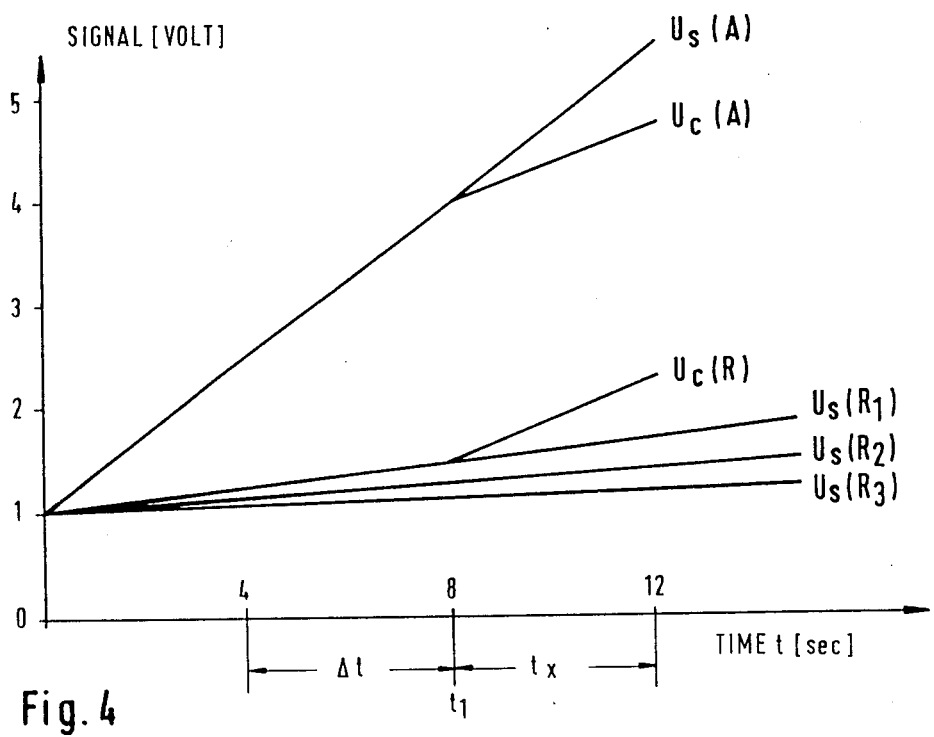
FIG. 4 shows the principal variation of the sensor signal during toasting and/or warming up of an item to be toasted and/or warmed up and the variation of the associated reference signal in the control circuit according to FIGS. 1 and 2.

FIG. 4 shows on its horizontal axis the time in seconds and on its vertical axis the principal variation of the signals $U_c$ and $U_s$. Herein, $U_s(R_1)$, $U_s(R_2)$ and $U_s(R_3)$ imply the sensor signal which is obtained when different objects to be toasted $R_1$, $R_2$ or $T_3$ are introduced into the toasting chamber, whereas $U_s(A)$ represents the variation of the sensor signal in the absence of any item to be toasted in the toasting chamber and when the toaster is used for warming up a respective item. $U_c$ corresponds to the reference signal applied to the positive input of the second comparator 5 which rises with the discharge of the electrolytic capacitor 20 starting at the moment $t = t_1 = 8$ seconds.

It results from the principal variation of the sensor signal $U_s$ and the reference signal $U_c(A)$ for the warming-up operation and, respectively, $U_c(R)$ for the toasting operation, which variation is shown in FIG. 4, that a characteristic order of magnitude exists for all three types of signal shown during the period of time $t_x$ in all practically possible operating conditions of the bread toaster. That means in detail that within the period of time $t_x$ provided that an object to be toasted is in the toasting chamber, all occurring sensor signals $U_s(R)$ are below the voltage value of the reference signal $U_c(R)$ and that, within the same period of time, in the event that no object to be toasted is in the toasting chamber, the corresponding sensor signal $U_s(A)$ is principally greater than the reference signal $U_c(A)$. The reference signal $U_c$ applied to the positive input of the second comparator 5 as well as the sensor signal $U_s$ applied to its negative input, therefore, during the period of time $t_x$ are well suited as a reliable criterion for whether the bread toaster is used for toasting a toasting object disposed in its toasting chamber or for warming up a respective item. Therefore, the output signal $U_A$ of the second comparator 5 and the first timer signal $T_1$ which is issued at the output 16a of the timer 16 and which alternates from the LOW to HIGH-level at the moment $t_1 = 8$ seconds are compared in a second coupling stage 9 consisting of a NAND-gate.

Irrespective of whether the amplified sensor signal $U_s$ has still adopted a relatively low value (e.g. for toasting the item the first time in a series of toasting processes) at the moment $t = 0$ or whether it adopted already a higher value (e.g. when continuing a manually interrupted toasting process), this comparison will supply the correct result, since—as mentioned already—basically the instantaneous value of the amplified sensor signal $U_s$ is taken at the output of the comparator 7 during the time interval $\Delta t$.

When the output signal $U_A$ applied to the input 9a of the second coupling stage 9 has a HIGH level, what means that the bread toaster is in the toasting operation, the output 9c of the second coupling stage 9 will alternate to LOW, since a HIGH signal is applied to the second input 9b of this coupling stage as well.

If, however, the level of the output signal $U_A$, is LOW, what means that the bread toaster is in the warming-up operation, the output 9c of the second coupling stage 9 remains on the HIGH-level.

In the warming-up operation, the following applies for the memory flip-flop 10, 11:

Because of the charging of the capacitor 24, the signal level at the input 11b alternates from LOW to HIGH already before the time interval $\Delta t = 4$ seconds has lapsed when the time constant (capacitor 24, resistor 25) has been suitably chosen. Yet no change occurs at the two outputs of the memory flip-flop (storing). This applies also for the moment $t_1 = 8$ seconds and for the period thereafter, while the first timer signal $T_1$ is on the LOW-level again.

In consequence of the signal level at the two outputs 10c and 11c of the memory flip-flop 10, 11 characterizing the warming-up operation, and in consideration of the fact that a LOW-level is present at the input 13b of the NAND-gate 13 after the moment $t_1 = 8$ seconds until further notice, both the output 13c of the NAND-gate 13 and the output 14c of the first coupling stage 14 adopt the HIGH-level, the result being that the output 15c of the NAND-gate 15 is on the LOW-level. This implies that the bread toaster remains in operation irrespective of the level of the toasting-time control signal R at the input 14a of the first coupling stage 14.

The bread toaster is put out of operation only by the second timer signal $T_2$ which alternate from LOW to HIGH after one minute at the output 16b of the timer 16, since then a warming-up time control signal A will be formed at the output 13a of the NAND-gate 13 by the fact that the level declines from HIGH to LOW, in consequence whereof the level at the output 15a of the NAND-gate 15 rises from LOW to HIGH.

It can be taken from the previously described signal sequences that in case the bread toaster is in the warming-up operation after the moment $t_1 = 8$ seconds, irrespective of the level of the toasting-time control signal R, the toaster is maintained in operation for so long until it is switched off after one minute by the warming-up time control signal A combined with the second timer signal $T_2$.

When the bread toaster is in the toasting operation, however, the following applies:

From the basic condition after switch-on of the bread toaster, the level at the input 11b of the memory flip-flop 10, 11 alternates, in turn, prior to termination of the time interval $\Delta t_1 = 8$ seconds from LOW to HIGH for the reasons described already in connection with the warming-up operation. Thus, again the storing case exists for the memory flip-flop 10, 11, from what ensues that the signal levels at the two outputs 10c and 11c do not change compared to the basic condition. If, however, the level at the output 9c of the second coupling stage 9 alternates from HIGH to LOW after the moment $t_1 = 8$ seconds as a result of the first timer signal $T_1$ occurring at the output 16a of the timer 16, the two outputs 10c and 11c of the memory flip-flop 10, 11 are set anew. That means, the output 10c alternates from LOW to HIGH, whilst the output 11c alternates from HIGH to LOW. The two outputs 10c and 11c will keep their signal levels even in the event that the level of the first timer signal $T_1$ declines again from HIGH to LOW. This is because now the storing case has occurred with outputs inverted in comparison with the basic condition of the memory flip-flop 10, 11.

In consequence of the signal levels of the two outputs 10c and 11c of the memory flip-flop 10, 11 characterizing the toasting operation, and in consideration of the fact that, like in the warming-up operation, a LOW-level is applied to the input 13b of the NAND-gate until the moment $t_2 = 1$ minute, a HIGH-level is applied to the output 13c of the NAND-gate 13 as well as in the warming-up operation. Likewise, a HIGH-level is applied to the input 14b of the first coupling stage 14.

Therefore, it is decisive in the toasting operation—in contrast to the warming-up operation—whether the toasting-time control signal R applied to the output of the first comparator 4 is on the level HIGH or LOW. When it is on the HIGH-level, what implies that the level of the sensor signal $U_s$ which was adjusted by the potentiometer 3 for the desired toasting degree of the item to be toasted has been reached already, the two HIGH-levels at the inputs 14a and 14b will result in a LOW-signal being present at the output 14c of the first coupling stage 14. In conjunction with the HIGH-signal applied to the second input 15b of the switch step 15, the LOW-signal applied to its first input 15a causes switch-off of the bread toaster. It becomes apparent from the previously described signal sequences for the toasting operation that the bread toaster will remain in operation after the period of time $t_x$ for so long until it is disabled by the toasting-time control signal R.

The voltage divider composed of the resistors 17, 39 and 40 and the diode 18 (see FIG. 3) prevent an inadvertent switchover from the toasting operation to the warming-up operation. Further resistors 21, 26, 43, 46 and 47 shown in FIG. 3 serve for the conventional wiring up of further voltage dividers or comparators.

Should during the toasting operation the signal at the positive input of the first comparator 4 not reach the signal level definable by the potentiometer 3 for any reasons whatsoever, be it due to malfunction of the sensor 1 or the amplifier 2 or due to the fact that the sensor 1 is blocked off by any object from the infrared radiation it is exposed to, the bread toaster will be put out of operation nevertheless caused by the co-action of the second timer signal $T_2$ and the fourth timer signal $T_4$ after the lapse of three minutes.

Namely, when the level of the fourth timer signal $T_4$ alternates from LOW to HIGH after termination of two minutes, and when the second timer signal $T_2$ also alternates again from LOW to HIGH after three minutes, both inputs 12a, 12b of the NAND-gate 12 will have a HIGH-level, while said's output 12c is on the LOW-level again. Therefore, the capacitor 234 will discharge again. The time constant for the discharging action is the same like for the charging action and is in the order of magnitude of several $10^{-1}$ seconds, for instance. Caused by the discharge of the capacitor 24, the signal at the input 11b of the memory flip-flop 10, 11 alternates from HIGH to LOW, what—due to the previously existing storing case—has as a consequence that its two outputs 10c and 11c, respectively, alternate again to the LOW or HIGH-level, respectively, hence the memory flip-flop 10, 11 is in its basic condition again. The HIGH-level at the output 11c of the memory flip-flop 10, 11 in conjunction with the HIGH signal level of the second timer signal $T_2$ that is applied to the input 13b of the NAND-gate 13 results in that the output 13c of the NAND-gate 13 alternates from HIGH-to LOW.

The LOW-level which is thus applied to the input 15b of the NAND-gate 15—irrespective of the level applied to said's other input 15a—has as a consequence that said's output 15c has a HIGH-level, what in turn has as a result that the bread toaster is put out of operation. That is to say, in the toasting operation, the bread toaster is put out of operation by an automatic switch-off control signal Z which is issued by the output 11c of the memory flip-flop 10, 11, should the switch-off not be initiated by the toasting-time control signal R for the reasons referred to already hereinabove. The period of time of three minutes after the start-up of the bread toaster is chosen such that, with any toasting object whatsoever, any desired toasting degree is assumed to have been reached already appreciably before the termination of this period of time so that the automatic switch-off control signal Z principally terminates an improper toasting operation of the bread toaster.

What is claimed is:

1. A bread toaster comprising housing structure with, a toasting chamber with a heating device arranged therein, at least one loading and unloading opening for an item to be toasted, and retaining means for an item to be warmed up mountable on top of said loading and unloading opening, a step-switch for controlling said heating device, a first coupling stage connected to said step-switch, said first coupling stage having a first input responsive to a toasting-time control signal (R) and a second input responsive to a warming-up time control signal (A), a sensor responsive to infrared radiation emitting from the heated item being toasted in said toasting chamber and adapted to deliver a sensor signal ($U_s$) derived therefrom, a first comparator circuit responsive to said sensor signal ($U_s$) for issuing when said sensor signal attains a predetermined level, circuitry for applying said toasting-time control signal (R) to said first input of said first coupling stage for controlling said heating device, and a control circuit which, at a first definable moment ($t_1$) after start-up of the bread toaster, is adapted to compare said sensor signal ($U_s$) with a reference signal ($U_c$), whereupon in the event that said reference signal ($U_c$) is in excess of said sensor signal ($U_s$), the bread toaster will be set out of operation after said predetermined level of said sensor signal ($U_s$) is attained by the fact that said toasting-time control signal (R) is delivered from said first comparator to said first input of said first coupling stage, whilst in the opposite case, said heating device is switched off by said warming-up time control signal (A) which is generated by said control circuit at a second definable moment ($t_2$) and is supplied to said second input of said first coupling stage.

2. A bread toaster as claimed in claim 1 and further including circuitry connected between said sensor and said control circuit for adjusting said sensor signal ($U_2$).

3. A bread toaster as claimed in claim 1 wherein said control circuit comprises a memory flip-flop, a second coupling stage, a timer, adapted upon start-up of the bread toaster at the moment t=0, to issue at a first output a first periodic timer signal ($T_1$) and to issue at a second output a second periodic timer signal ($T_2$), and a second comparator whose negative input is furnished with said sensor signal ($U_s$) and whose positive input is furnished with said reference signal ($U_c$), and whose output signal ($U_A$) is delivered to a first input of said second coupling stage, whose second input is connected to said first output of said timer, and circuitry for applying the output signal ($U_G$) of said second coupling stage to a first input of said memory flip-flop whose first output is connected to the second input of said step switch.

4. A bread toaster as claimed in claim 3 wherein said timer, with the start-up of the bread toaster, is adapted to issue from a third output a third periodic timer signal ($T_3$) for a time interval ($\Delta t$), and said control circuit includes an assembly unit which receives said sensor signal ($U_s$) at the positive input of said second comparator during the time interval ($\Delta t$) and, upon lapse thereof, generates said reference signal ($U_c$).

5. A bread toaster as claimed in claim 4 wherein said assembly unit includes a capacitor whose positive connection is connected via a first resistor to the supply voltage and whose negative connection is connected to the output of a third comparator, said assembly unit comprising a second resistor connected in parallel to said capacitor, and said third comparator during the timer interval ($\Delta t$) performing as an amplifier with the amplification factor V=1, the positive input of said amplifier being furnished with said sensor signal ($U_s$) and its negative input being connected to the output of a fourth comparator, said fourth comparator having a positive input to which said third timer signal ($T_3$) is applied and a negative input to which a reference voltage is applied and which is closed on the output side during said time interval ($\Delta t$).

6. A bread toaster as claimed in claim 5, wherein said capacitor is an electrolytic capacitor.

7. A bread toaster as claimed in claim 5 and further including a Zener diode connected to stabilize the voltage applied to the positive connection of said capacitor.

8. A bread toaster as claimed in claim 6 and further including a clamping circuit connected to the output of said third comparator for preventing the voltage value at the negative connection of said electrolytic capacitor from exceeding the voltage value at the positive connection of said electrolytic capacitor.

9. A bread toaster as claimed in claim 8 wherein said clamping circuit includes a voltage divider circuit and a diode, the cathode of said diode being connected to said voltage divider and the anode of aid diode being connected to the output of said third comparator.

10. A bread toaster as claimed in claim 5 wherein said first resistor effective during charging of said capacitor has such a resistance value that the corresponding time constant is small in relation to the time interval ($\Delta t$), and said second resistor effective during discharging of said capacitor has such a resistance value that the corresponding time constant is large in relation to the time interval ($\Delta t$).

11. A bread toaster as claimed in claim 10 wherein the time interval ($\Delta t$) amounts to four seconds, said first definable moment ($t_i$) is after eight seconds, the time constant of the RC-element composed of said first resistor and said capacitor is in the order of magnitude of $10^{-1}$ second, and the time constant of the RC-element composed of said capacitor and said second resistor is in the order of magnitude of one hundred seconds.

12. A bread toaster as claimed in claim 3 and further including a third coupling stage and a fourth coupling stage, each of said third and fourth coupling stages including first and second inputs and an output, and wherein said timer is adapted to issue at a fourth output a fourth timer signal ($T_4$) which, in its signal shape, corresponds to said second timer signal ($T_4$), yet has the double period duration and is supplied to said second input of said third coupling stage (13), and in that said second timer signal ($T_2$) and said fourth timer signal ($T_4$) each are supplied to an input of said fourth coupling stage, whose output is connected to the second input of said memory flip-flop with said third and fourth coupling stages cooperating with said memory flip-flop in such a fashion that, in the event that neither by the toasting-time control signal (R) nor by the warming-up time control signal (A) the bread toaster has been set out of operation already, the bread toaster will be switched off at the point of time of the second change of aid second timer signal ($T_2$) from LOW to HIGH by an automatic switch-off control signal (Z) which is applied from the second output of aid memory flip-flop to the first input of said third coupling stage.

13. A bread toaster as claimed in claim 12 and further including a time function element comprised of a capacitor and a resistor connected between said fourth coupling stage and said memory flip-flop.

14. A bread toaster as claimed in claim 12 wherein said coupling stages and said memory flip-flop are composed of NAND-gates.

15. A bread toaster as claimed in claim 1 wherein said second definable moment ($t_2$) is after one minute from the moment of start-up of the bread toaster.

16. A bread toaster as claimed in claim 15 wherein said control circuit comprises a memory flip-flop, a second coupling stage, a timer, adapted upon start-up of the bread toaster at the moment $t=0$, to issue at a first output a first periodic timer signal ($T_1$) and to issue at a second output a second periodic timer signal ($T_2$), and a second comparator whose negative input is furnished with said sensor signal ($U_s$) and whose positive input is furnished with said reference signal ($U_c$), and whose output signal ($U_A$) is delivered to a first input of said second coupling stage, whose second input is connected to said first output of said timer, and circuitry for applying the output signal ($U_G$) of said second coupling stage to a first input of said memory flip-flop whose first output is connected to the second input of said step switch.

17. A bread toaster as claimed in claim 16 wherein said timer, with the start-up of the bread toaster, is adapted to issue from a third output a third periodic timer signal ($T_3$) for a time interval ($\Delta t$), and said control circuit includes an assembly unit which receives said sensor signal ($U_s$) at the positive input of said second comparator during the timer interval ($U_c$), said assembly unit including an electrolytic capacitor, a first resistor connected in parallel to said capacitor, a Zener diode connected to stabilize the voltage applied to said capacitor, and a clamping circuit for preventing the voltage value at the negative connection of said electrolytic capacitor from exceeding the voltage value at the positive connection of said electrolytic capacitor.

18. A bread toaster as claimed in claim 17 wherein the charging interval of said capacitor is small in relation to the time interval ($\Delta t$), and the discharging interval of said capacitor is large in relation to the time interval ($\Delta t$).

* * * * *

UNITED STATES PATENT AND TRADEMARK OFFICE
CERTIFICATE OF CORRECTION

PATENT NO. : 4,976,194
DATED : December 11, 1990
INVENTOR(S) : Heinz Kelterborn

It is certified that error appears in the above-identified patent and that said Letters Patent is hereby corrected as shown below:

```
Col. 1, line 8, "tasting" should be --toasting--.
Col. 3, line 9, "brad" should be --bread--;
        line 15, "WHen" should be --When--;
        line 45, "comaprator" should be --comparator--.
Col. 5, line 38, "warmingup" should be --warming up--.
Col. 6, line 1, "toastingtime" should be --toasting time--.
        line 35, "13" should be deleted.
        line 39, "HIGHsignal" should be --HIGH-signal--
Col. 7, line 1, after "16c" insert --and 16d--;
        line 4, "The" should be --the--;
        line 52, "The" should be --the".
Col. 8, line 36, "Mw" should be --MΩ--;
        line 62, after "t_x" insert a space.
Col. 11, line 11, "234" should be --24--.
Col. 13, claim 9, line 1, "aid" should be --said--;
         claim 12, line 25, "(T_4)" should be --(T_2)--;
         claim 12, line 38, "aid" should be --said--;
         claim 12, line 41, "aid" should be --said--.
```

UNITED STATES PATENT AND TRADEMARK OFFICE
CERTIFICATE OF CORRECTION

PATENT NO. : 4,976,194

DATED : December 11, 1990

INVENTOR(S) : Heinz Kelterborn

It is certified that error appears in the above-identified patent and that said Letters Patent is hereby corrected as shown below:

Col. 14, claim 17, line 31, after "interval" insert --($\Delta t$) and, upon lapse thereof, generates said reference signal--.

Signed and Sealed this

Twenty-third Day of June, 1992

Attest:

DOUGLAS B. COMER

*Attesting Officer*  *Acting Commissioner of Patents and Trademarks*